United States Patent
Woodbridge et al.

(10) Patent No.: US 6,953,524 B2
(45) Date of Patent: Oct. 11, 2005

(54) SCREEN ASSEMBLY FOR COMBINED SEWER OVERFLOW WEIR

(75) Inventors: Barrie Christopher Woodbridge, Bedford (GB); Kevin Donald Cottam, Bedford (GB)

(73) Assignee: Hydro International PLC (GB)

( * ) Notice: Subject to any disclaimer, the term of this patent is extended or adjusted under 35 U.S.C. 154(b) by 193 days.

(21) Appl. No.: 10/362,752

(22) PCT Filed: May 14, 2001

(86) PCT No.: PCT/GB01/02121
§ 371 (c)(1),
(2), (4) Date: Feb. 26, 2003

(87) PCT Pub. No.: WO02/18720
PCT Pub. Date: Mar. 7, 2002

(65) Prior Publication Data
US 2004/0028474 A1 Feb. 12, 2004

(30) Foreign Application Priority Data
Aug. 29, 2000 (GB) .............................. 0021212
Dec. 6, 2000 (GB) .............................. 0029742

(51) Int. Cl.[7] .............................. B01D 29/64
(52) U.S. Cl. .......................... 210/97; 210/162; 210/407; 210/497.01; 210/499; 210/506
(58) Field of Search ................... 210/157–162, 210/97, 407, 413, 415, 396, 403, 497.01, 247, 248, 499

(56) References Cited

U.S. PATENT DOCUMENTS

| 4,424,129 A | * | 1/1984 | Bunger | 210/388 |
| 4,836,919 A | * | 6/1989 | Huber | 210/158 |
| 4,859,322 A | * | 8/1989 | Huber | 210/162 |
| 5,814,216 A | | 9/1998 | Filion | |
| 5,840,180 A | * | 11/1998 | Filion | 210/162 |

FOREIGN PATENT DOCUMENTS

| DE | 39 28 681 A1 | | 4/1990 |
| GB | 792741 | | 4/1958 |
| GB | 827 048 | | 2/1960 |
| GB | 2249736 | * | 5/1992 |
| GB | 2 310 382 A | | 8/1997 |

* cited by examiner

Primary Examiner—Joseph Drodge
(74) Attorney, Agent, or Firm—Douglas E. Jackson; Stites & Harbison, PLLC

(57) ABSTRACT

A screen assembly in which the screen (10) is in the form of an inverted semi-circular trough the foul flow (A) to be screened approaching the underside of the screen so that debris which is filtered falls away from the screen by gravity so minimising blockages and "blinding" of the screen. A helical sweeper (20) is provided to minimise adherence to the screen.

5 Claims, 1 Drawing Sheet

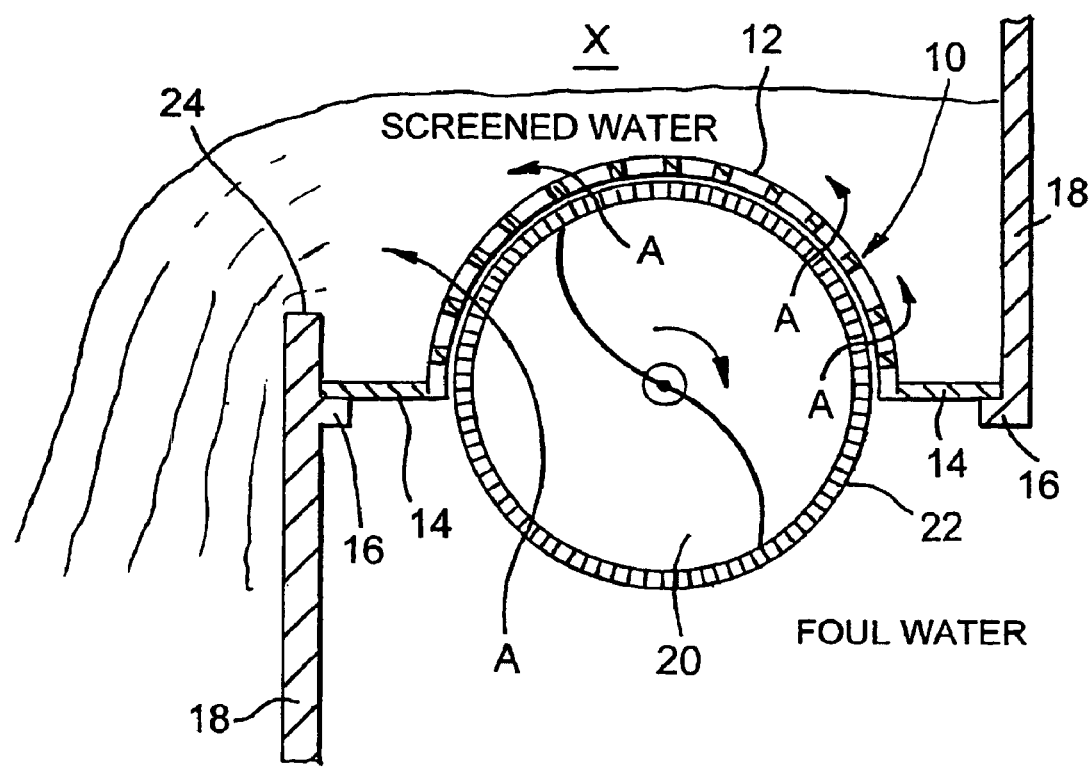

SCREEN ASSEMBLY FOR COMBINED SEWER OVERFLOW WEIR

The invention relates to screens for Combined Sewer Overflow(CSO) Weirs for the screening of excess storm flows from the sewerage system to a recipient waterway, relieving hydraulic pressure on downstream sewerage and waste water treatment works (WwTW's).

European legislation and aesthetic concerns demand that matter greater than 6 mm is not passed over the weir to hang on the river bank.

If any screen is used it must be capable of working unattended and largely unmaintained for most of its life. Some existing screens become blinded or allow matter through the screen or cannot remove captured matter from the screen and return this to the foul flow for treatment at the WwTW.

The present (known) CSO weir screens comprise a part-cylindrical screen to the concave side of which the foul water flow is disposed, a helical scraper is disposed on the inside such that a rotation of the scraper the helical edge sweeps the concave surface of captured matter, the convex side of the screen connecting in use with a screened water outflow to a recipient waterway, the screen being disposed such that screen is generally a U-shaped trough, the concave surface is generally disposed such that any solid matter swept from the screen remains by gravity in foul flow, initially in the bottom of the U-shaped screen, leading to blockage problems.

The screen assembly of the present invention separates the solid matter from the carrying storm liquid, being placed in use alongside the overflow weir to intercept/screen the excess storm flow keeping any larger matter in the foul flow and allowing liquid and smaller solid matter over the weir to pass to the recipient waterway, yet minimising blockage problems.

The screen assembly of the present invention comprises a screen in the shape of a cylinder a longitudinal section of which has been removed, so that the screen is in lateral section of arcuate form, the screen being disposed between separated foul water and screened water flows such that foul water is received on the concave face, water and small solids passing through the screen to the screened water flow, and large solids being retained on the foul water side, a helical sweeper being disposed on the foul water side within the cylindrical section so that on rotation of the sweeper in use any solid matter adhering to the concave surface of the screen is dislodged and kept in the foul water flow so keeping the screen clear and minimising blockage thereof, the assembly being disposed such that the convex surface of the screen is above the concave surface which faces downwardly so that water and small solids pass upwardly through the screen, the larger solids falling back from the screen in the foul stream with the assistance of gravity.

Preferably the screen is hemicylindrical and is thus in lateral section an 180 degree arc or thereabouts.

Preferably the helical screw sweeper is provided with a brush element along the sweeper edge thereof to contact the concave surface of the screen. The brush is preferably nylon.

The screen is disposed along the edge of a weir such that screened water is carried over the weir and on to a recipient waterway.

The screen is preferably made from stainless steel and may be provided with a non-stick coating. The screen perforation is typically 6 mm or such other size as may be prescribed for the application.

The helical sweeper is electrically or hydraulically powered in known manner. Space at the upstream and downstream ends of the screen is to be kept clear to allow the passage of screened effluent around the screen and then over the weir.

In sewerage systems which are susceptible to deposition of large amounts of detritus and plastics, an accumulation of floating matter can occur in the screen chamber after a dry period followed by a storm.

It is well known in the art to provide, in these circumstances, a launder arrangement to transfer debris from the screen chamber to another separate chamber or region.

The present invention may be preferably modified for such systems by providing a launder arrangement comprising a said helical sweeper having a remote end to which material is conveyed by movement of said sweeper, the remote end being enclosed by a stainless steel pipe of slightly larger diameter than the sweeper, the pipe being connected to a secondary chamber downstream into which at least some of said detritus and plastics may be conveyed by the sweeper so reducing the amount of detritus and plastics and the consequent clogging effect in the vicinity of the screen.

An Embodiment of the invention will now be described by way of a example only and with reference to the accompanying drawing the single figure of which is a schematic lateral cross sectional view of an assembly according to the invention.

The assembly comprises a hemi-cylindrical perforated screen shown generally as 10 having perforations 12 of 6 mm in its cylindrical surface and supported by two flanges 14 on frame 16 provided on walls 18 which divide the foul water flow from the screened water flow. The flanges 14 are releasably secured to the abutments 16 in known manner by screws (not shown). The screen 10 is made from stainless steel and is coated with a non-stick coating to discourage adherence of paper and solids thereto.

Within the cylindrical screen is mounted, on the axis of the cylinder, a helical screw 20 having along its helical edge a continuous brush 22 of nylon bristle. (A gap is shown between the bristles of brush 22 and the screen 10 in the drawing and this is the situation which will occur after heavy wear—the gap has been exaggerated for clarity). It will be noted that the screen is disposed concave face down and that the foul water flow 'A' is upward through the screen 10 into the screened water channel X and thence over a weir 24 and via a conduit to a recipient waterway (not shown).

Because the screen is disposed concave face down, any solids swept from the screen 10 by sweeper 20 will fall away from the screen by gravity instead of remaining within the screen as in the prior art (where the screen is concave face up).

Various modifications may be made without departing from the scope of the invention as defined in the appended claims. For example the screen need not be hemisphercial but could, in section, be greater than or less than 180 of arc. This is less advantageous since with less than 180 of arc the screen is unnecessarily narrow whereas if the arc is much more than 180 (so that the screen and its flanges are similar to the Greek letter omega) then debris falling from the top of the screen may fall on to the re-entrant arcuate surfaces below which is less advantageous.

The helical screw sweeper may be replaced by a radial sweeper.

What is claimed is:

1. A screen assembly mounted to a weir wall comprising:
  a screen in the shape of cylinder, a longitudinal section of which has been removed, so that the screen is in lateral section of arcuate form so as to form a concave surface and a convex surface the screen being adjacent to the weir wall to form a seperate foul water side and a screened water side such that foul water is received on the concave surface, water and small solids passing through the screen to the screened water side, and large solids being retained on the foul water side, a helical sweeper being disposed on the foul water side within the cylidrical section so that on rotation of the sweeper in use any solid matter adhering to the concave surface of the screen is disposed and kept in the foul water side so keeping the screen clear and minimizing blockage thereof, and a mounting member which mounts the screen to the weir wall with the convex surface of the screen above the concave surface which faces downwardly so that water and small solids pass upwardly through the screen, the larger solids falling back from the screen in the foul water side with the assistance of gravity.

2. A screen assembly as claimed in claim 1 in which the screen is hemicylindrical and is thus in lateral section an 180 degree arc or thereabouts.

3. A screen assembly as claimed in claim 1 in which the helical sweeper is provided with a brush element along the sweeper edge thereof to contact the concave surface of the screen.

4. A screen sweeper as claimed in claim 1 in which the screen is made from stainless steel and provided with a non-stick coating.

5. A screen assembly as claimed in claim 1 in which there is provided a launder arrangement comprising said sweeper having a remote end to which material is conveyed by movement of said sweeper, the remote end being enclosed by a stainless steel pipe of slightly larger diameter than the sweeper, the pipe being connected to a secondary chamber downstream into which at least some of said larger solids may be conveyed by the sweeper, so reducing the amount of larger solids and the consequent clogging effect in the vicinity of the screen.

* * * * *